Patented Mar. 27, 1951

2,546,575

UNITED STATES PATENT OFFICE 2,546,575

PROCESS FOR TREATING NONFIBROUS REGENERATED CELLULOSE

William M. Wooding, Springdale, Conn., assignor to American Cyanamid Company, New York, N. Y., a corporation of Maine No Drawing. Application August 6, 1949, Serial No. 109,062

9 Claims. (Cl. 117—76)

This invention relates to a process for treating non-fibrous regenerated cellulose film in order to improve the anchoring of said film to the subsequently applied topcoat. This invention further relates to a process of treating non-fibrous regenerated cellulose film with an urea-formaldehyde polyfunctional polyamine cationic resin in order to improve the anchoring of said film to the subsequently applied topcoat. This invention further relates to a process of producing a non-fibrous regenerated cellulose film, which has been subjected to treatment by immersion in an aqueous dispersion of an urea-formaldehyde polyfunctional polyamine cationic resin wherein the said film when so treated becomes so securely bonded to the subsequently applied water repellent topcoat that it is securely anchored thereto and is capable of withstanding prolonged immersion in water and is further capable of withstanding prolonged exposure to the moisture of the atmosphere or to the moist conditions of the surroundings to which it may be subjected.

Non-fibrous regenerated cellulose films have been found to be utilizable for the packaging of many products which in the course of storage, shipment, and display, must be subjected to moist atmospheric conditions and as a consequence, the water repellent topcoats, which have been attached to the regenerated cellulose films, tend to slough off even after brief exposures to the moist atmospheric conditions. This factor has limited somewhat the expansion of the use of the regenerated cellulose films in additional fields because of this defective characteristic. Considerable work has been done in the field in an endeavor to produce an anchoring agent which will securely bond the water repellent topcoat to the regenerated cellulose film base so that these cellulosic films, when so treated, may be subjected to moist atmospheric conditions and even water immersion for prolonged periods of time while still remaining intact and continuing to provide the necessary protection which the packaged products require.

One of the objects of the present invention is to produce a regenerated cellulose film impregnated with an anchoring agent which will securely bond the film base to the water repellent topcoat so as to withstand prolonged subjection to moist or wet conditions. A further object of the present invention is to accomplish an improvement in the process of producing treated cellulose film while still effecting an improvement in the economy of the process of anchoring the water repellent topcoat to the cellulose film base. A still further object of the present invention is to produce water repellent cellulose films which are adaptable for use in the packaging of food products, particularly those that are in a moist or frozen state or are subjected to moist or wet conditions, such as in the packaging of fish, cheese, frozen foods, vegetables, and the like. Further objects of the present invention will be set forth in greater detail hereinbelow.

In order that the present invention be completely understood, the following examples set forth hereinbelow will serve to illustrate in greater detail that which the applicant has discovered. It is to be remembered that these examples are by way of illustration only and are not to be interpreted as a limitation on the case except as indicated by the appended claims.

EXAMPLE 1

A 3% aqueous solution of an urea-formaldehyde tetraethylene pentamine cationic resin is prepared. A strip of wet, swollen, non-fibrous cellulosic film is immersed therein for a period of about 5 to 10 minutes. The film is removed from the resin solution and then immersed in a plasticizing bath, removed and dried for about 10 minutes at 200° F. on a drying frame. It is desirable to secure the film in order that there be no shrinking during the drying operation. The film is then coated with a water repellent topcoat and then subjected to a water immersion test for an extended period of time. The film is then removed and it is to be noted that the anchoring of the topcoat to the base film is so completely bonded thereto that this test for bonding efficiency produced results which are equal to or better than other commercially used anchoring agents tested. The results of this test are set forth hereinbelow.

Table 1
WATER IMMERSION TEST

| Sample Tested | Elapsed Time | | | | | | | | | | | |
|---|---|---|---|---|---|---|---|---|---|---|---|---|
| | 10 min. | ½ hr. | 1 hr. | 2 hr. | 4 hr. | 6 hr. | 1 Day | 2 Days | 3 Days | 7 Days | 14 Days | 17 Days |
| Blank (No Resin Treatment) | G | F | F | P | P | P | N | | | | | |
| Resin X, 1 Bath | G | G | G | G | G | G | G | G | G | G | G | G |
| Resin X, 2 Bath | G | G | G | G | G | G | P | P | P | P | P | P |
| Resin (Ex. 1), 1 Bath | G | G | G | G | G | G | G | G | G | G | G | G |

Where G=good, no slough; F=fair, slight slough; P=poor, considerable slough; N=failure, sloughed over a wide area.

Other samples of the regenerated cellulose film treated in accordance with the process set forth in Example 1 were subjected to water immersion and then tested by use of the tensile test for bonding efficiency. A brief discussion of this tensile test for bonding efficiency as applied to the coated film is described herein in order that the significance of the bonding efficiency produced may be realized. The film base after treatment in accordance with the process set forth in Example 1 is attached to the adhesive side of a masking tape. The entire assembly is then subjected to immersion from periods of time ranging from 2½ hours to 2 days and the film on removal from the water is separated from one edge of the masking tape and a measured pressure is applied to that edge by means of weights in order to ascertain that force which is necessary to separate the cellulosic film from the water resistant topcoat, thus establishing a criterion whereby the comparative merits of the bonding agents may be ascertained. These results as applied to the samples treated in accordance with the process in Example 1 are set forth in detail hereinbelow.

Table 2
RESULTS OF TAPE TENSILE TESTS FOR BONDING EFFICIENCY
[Tensile reading, grams.]

| Tested Sample | 2 Day Soak | | 2½–3½ hr. Soak | |
|---|---|---|---|---|
| | Range | Average | Range | Average |
| Blank (no resin pretreatment) | 3–4 | 3.5 | 12.5–13.5 | 13 |
| Control (commercial regenerated cellulose) | 6–10 | 8 | 27–28 | 27.5 |
| Commercially Used Resin X | | | 15–25 | 20 |
| | | | 30–35 | 32.5 |
| Resin of Example 1 | 28–30 | 29 | | |

EXAMPLE 2

A urea-formaldehyde diethylene triamine cationic resin in aqueous solution is prepared having a concentration of about 10% solids. The cellulose film is subjected to treatment therein in much the same manner as set forth in Example 1 except that use is made of a plasticizing agent dissolved in the aqueous resin solution. After the film has been removed from the resin bath and coated with the water repellent topcoat, it is subjected to a water immersion test for a prolonged period of time and the topcoat is found to be securely anchored to the film base with no sloughing. The tensile test for bonding efficiency again demonstrates that the anchoring is 50–100% improved over that which other anchoring agents produce.

In the practice of the process of the instant invention, it is generally desirable to introduce the cellulosic films into the aqueous resin dispersion in a wet swollen condition. Generally, in the manufacture of the finished moisture resistant film, if the steps from the manufacture of the film itself through the subsequent treatment of the film with the resin dispersion are continuous, the film is introduced into the aqueous resin dispersion in a wet and swollen condition. On the other hand, if the steps from the production of the film to the treatment of the film are not continuous, it will be necessary to subject the film to immersion in an aqueous bath in order to bring the film into a wet and reswollen state. There are a number of different modifications of the process for treating the films in accordance with the practice of this invention and for the sake of clarity, a number of these different methods will be enumerated hereinbelow. One of the preferred embodiments of the instant invention would be to introduce the wet swollen film into the aqueous resin dispersion into which a plasticizing agent has been incorporated. The period of time during which the film should be immersed in the aqueous dispersion of the resin is about 2 to 10 minutes. The film is then removed from the resin-plasticizer bath and passed through a drying chamber which serves not only to remove the moisture from the film but serves further to partially polymerize the resin on and in the film itself. At this point, the topcoat may be applied directly or the film may be rolled up and stored for subsequent treatment by application of the moisture resistant topcoat. A further modification of the present invention is to introduce the wet swollen cellulosic film into an aqueous dispersion of the resin, remove the film from the resin bath, introduce the film into a plasticizing bath, whereupon it may be removed, dried, and coated or alternatively rolled up without coating for storage purposes. A still further modification of the process itself may be accomplished by introducing the wet swollen film into the aqueous resin dispersion and upon removal therefrom, the film may be subjected to a washing step to remove any excess of resin which may have become impregnated in the surface of the film. The film is then removed from the washing bath and introduced into the plasticizing bath from which it is subsequently removed, dried, and coated with the moisture resistant coating in the same manner as indicated hereinabove. A still further modification of the process itself may be accomplished by spraying the wet swollen film with an aqueous dispersion of the resin, partially drying the film, subjecting the film to treatment in a plasticizing bath and upon removal therefrom, a second and more complete drying step may be accomplished, whereupon the film is ready for the application of the moisture resistant topcoat. There are further modifications to the general process itself, which will be obvious to anyone skilled in the art, and each of these modifications is within the intended scope of the present invention.

When the process of the instant invention is practiced, it is preferred to make use of a plasticizing agent. The plasticizing or softening agents, which one may use in the practice of the process of this invention, are compounds such as the water soluble polyhydric alcohols, the water soluble ureas, such as urea, thiourea, and the like. The use of the term polyhydric alcohol is not to be limited to those alcohols having more than 2 hydroxy groups but includes the dihydric alcohols as well. As polyhydric alcohols one may use successfully such compounds as ethylene glycol, diethylene glycol, glycerol, trimethyl glycerol, tetraethylene glycerol, and the like.

It is preferred that the plasticizing bath be an aqueous solution of a soluble polyhydric alcohol of relatively low concentration that is about 8%. By increasing the concentration of the polyhydric alcohol in the softening bath, no appreciable difference in result is to be noted even when the concentration of the polyhydric alcohol is increased to double that previously indicated. The minimum percentage of the polyhydric alcohol in the softening bath should not be appreciably less than 2% for best results. In the treatment of the regenerated non-fibrous cellulose films, the step of immersing the film in the plasticizing bath may be introduced either before immersion in the aqueous resin dispersion, the plasticizing agent may be incorporated in the aqueous resin dispersion, or the immersion in the plasticizing bath may be subsequent to immersion in the aqueous resin dispersion.

The applicant has discovered that the urea-formaldehyde polyfunctional polyamine cationic resins are particularly adaptable for use as anchoring agents in the bonding of the topcoat to the cellulose film because of their unusual tenacious character when applied to regenerated cellulose in the instant process. These cationic resins may be prepared by the use of urea and formaldehyde in proportions varying between 1:1 to 1:4 but it is preferred that the mol ratio of urea to formaldehyde be in the vicinity of about 1:2 to 1:3 with optimum results being accomplished when the mol ratio of the formaldehyde to urea is 2.3:1 to 2.8:1. When the mol ratios are below this optimum range, a substantial quantity of water or polyfunctional amine is necessarily employed in the preparation of the resins per se in order to avoid premature gelation. When the mol ratios of formaldehyde to urea are above the optimum range, the rate of polymerization is so retarded that an excessive period of time is necessary to effect any increase in viscosity. The quantity of polyfunctional amine employed is not particularly critical, though, of course a minimum amount must be employed in order to obtain water solubility and other desirable properties. Furthermore, satisfactory products may be obtained by reacting the amine at any stage of the reaction. It is preferred, however, that the amine be added after the initial reaction of urea and aldehyde. In the preparation of the resins per se it is preferred to use between about 2 to 80% of the polyfunctional amines based on the weight of urea and for optimum results, it is preferred to use between about 5 and 20% of the polyfunctional amine based on the weight of the urea. As examples of the polyfunctional polyamines which have been found to be satisfactory for the use in the preparation of these cationic resins are polyamines such as diethylene triamine, triethylene tetramine, tetraethylene pentamine and the like. These are representative of the polyalkylene polyamines. Alternatively, one may use aliphatic polyamines such as the alkylene polyamines or more specifically 1,2-diamino ethane, 1,3-diamino propane, 1,4-diamino-n-butane, 1,5-diamino-n-pentane, 1,6-diamino-n-hexane, 1,10-diamino-n-decane, 1,6-diamino-3-methyl-n-hexane, and the like. Amongst other polyamines, which are adaptable for use in the preparation of the cationic resins of the instant invention, are guanidine compounds such as guanidine hydrochloride, guanidine nitrate, guanidine acetate, guanidine carbonate and the like. Other polyamines which may be used are guanyl urea, biguanyl urea and the like.

The following examples will serve to illustrate the mode of preparation of the resins per se which are utilizable in the practice of the process of the instant invention. In these examples, which are given by way of illustration only, all parts are parts by weight.

RESIN A 200 parts of urea are dissolved in 678 parts of 37% aqueous formaldehyde solution and the pH of the solution is adjusted to 8.0–8.8 by the addition of about 7.5 parts of triethanol amine. The mixture is heated to 70° C. and is held at 70–75° C. for about 30 minutes. 20 parts of tetraethylene pentamine, 47 parts of water and 55.7 parts of 18% hydrochloride acid are then added. As the addition of both the polyamine and the acid liberate heat, a little cooling may be required. The reaction mixture is maintained at 70–75° C. for about 1 hour. The pH drops from about 3 to about 1.6 to 2.0 during the reaction and remains more or less constant thereafter. After the one hour reaction period, the pH of the solution is adjusted to about 3.0 with sodium hydroxide solution and the solution is then cooled to about 55° C. At this temperature, the viscosity of the resin syrup increases substantially and is measured from time to time. As soon as the desired viscosity is attained, (C–K) Gardner-Holdt, the syrup is neutralized with sodium hydroxide solution. The neutralized resin is water dilutable and very stable during storage. When it is desired to use the resin prepared according to the process set forth hereinabove, it may be diluted with water to whatever solids content is desired for use in impregnating the cellulosic film.

The resin prepared according to the process set forth hereinabove identified as Resin A was divided into 4 portions and diluted with water until the portions had concentrations of 0.05%, 0.1%, 0.5%, and 1.0% of tetraethylene pentamine modified urea-formaldehyde resin by weight based on the total weight of solution. Each of these resin solutions were utilized separately in the treatment of strips of non-fibrous regenerated cellulose films in accordance with the process set forth in Example 1. When the treatment of the films had been completed they were subjected to an accelerated immersion test in order to ascertain the varying merits of the resin dispersions depending on concentration in solution. Briefly, the accelerated immersion test is accomplished by subjecting the treated films to immersion in water, the temperature of which is controlled between 180–190° F. until the topcoat sloughs from the film base. The table set forth hereinbelow shows the comparative merits of these varying concentrations of resin solutions as bonding agents. In comparison with a blank, that is a coated cellulose film which has had no resin pre-treatment, and a coated cellulose film which had been pre-treated with a 3% dispersion of a resin commercially used for cellulose treatment purposes.

Table 3
ACCELERATED IMMERSION TEST

| Resin Used to Treat Film | Time Before Sloughing, in Minutes |
|---|---|
| Resin A, 0.05% | 9 |
| Resin A, 0.1% | 23 |
| Resin A, 0.5% | 28 |
| Resin A, 1.0% | >60 |
| Blank (no resin) | 1-2 |
| Commercial Resin X, 3% | 12 |

RESIN B 240 parts of urea, 811 parts of a 37% aqueous formaldehyde solution, and 18 parts of a 50% ethanol triamine solution are charged into a suitable reaction vessel. The pH of the mixture is about 8.6. The mixture is heated for about 20 minutes at which time the temperature reaches about 70° C. This temperature is maintained for about 15 minutes. Thereafter the reaction mixture is cooled to about 65° C. and 24 parts of tetraethylene pentamine, 21 parts of water, and 68 parts of 17.7% hydrochloric acid and 21 parts of water are added in that respective order. The pH of the reaction mixture drops gradually during the additions mentioned above to about 1.8. Heating is continued at 70° C. for approximately 1 hour and the mixture is then cooled to 55° C. and maintained at this temperature for about 15 minutes. When the desired viscosity of the syrup is attained (D–O, Gardner-Holdt), it may be neutralized with sodium hydroxide solution for storage purposes or it may be prepared for immediate use by dilution with whatever portion of water is necessary in order to give the desired solids concentration.

RESIN C 240 parts of urea, 811 parts of a 37% aqueous formaldehyde solution and sufficient 10% sodium hydroxide solution are mixed in order to give the reaction mixture a pH of about 8.5. This mixture is then heated to about 70° C. in 15 minutes and is maintained at that temperature for ½ hour. The reaction mixture is then cooled to 65° C. and 24 parts of diethylene triamine are added followed by 50 parts of water. The temperature rises exothermically to about 70° C. The reaction mixture is then cooled to about 65° C. and 54 parts of an 18% hydrochloric acid solution are added. Due to an exothermic reaction, the temperature again rises to 70° C. at which point the pH is about 4.2. This mixture is then maintained at 70–75° C. for 1 hour. The pH of the reaction mixture drops from about 4.2 to about 1.7 and remains at that point. The pH of the reaction mixture is then adjusted to about 3.0 by the addition of a 10% sodium hydroxide solution. The mixture is then cooled to about 55° C. and held at that temperature for about 15 minutes whereupon the pH of the mixture is adjusted to approximate neutrality by the addition of an appropriate amount of a sodium hydroxide solution.

RESIN D 811 parts of a 37% aqueous formaldehyde solution, 240 parts of urea, and 21 parts of a 50% triethanolamine solution are mixed together in a solution with a pH of 8.3. The mixture is then heated to 70° C. and maintained at this temperature for about 30 minutes. Thereafter, 52 parts of guanidine hydrochloride is added followed by the addition of 16.3 parts of an 18% hydrochloric acid solution. The pH of the reaction mixture is about 1.45. The mixture is maintained at a temperature of about 70–75° C. for approximately 1 hour and is then cooled to 40–45° C. and held at that temperature for approximately ½ hour. The resin syrup may then be neutralized for storage and may be reacidified by the addition of a material such as oxalic acid in preparation for use after storage or it may be used directly without the necessity for neutralization and subsequent reacidification simply by the dilution of the resin syrup to the desired solids content.

The resin prepared according to the process set forth hereinabove and identified as Resin D was divided into 4 portions and each diluted to concentrations of 0.05%, 0.1%, 0.5%, and 1.0% by weight, respectively, based on total weight of solution. Strips of regenerated cellulosic film were treated substantially in accordance with the method set forth hereinabove in Example 2 and were subjected to the accelerated immersion test comparable to the tests applied to the cellulose films treated with Resin A. The results accomplished are set forth hereinbelow and may be compared with a blank, which has had no resin pre-treatment. Similarly, these results may be compared with a strip of cellulosic film which has been pre-treated with 3% aqueous dispersion of a commercially used resin.

Table 4
ACCELERATED IMMERSION TEST

| Resin Used to Treat Film | Time Before Sloughing, in Minutes |
|---|---|
| Resin D, 0.05% | 13 |
| Resin D, 0.1% | 20 |
| Resin D, 0.5% | 35 |
| Resin D, 1.0% | >60 |
| Blank (no resin) | 1-2 |
| Commercial Resin X, 3% | 12 |

The practice of the process of this invention can be extended so as to include the treatment of a variety of non-fibrous cellulosic films. It may be applied to films of regenerated cellulose prepared from solutions of cellulose xanthates, cuproammonium cellulose, cellulose nitrate, cellulose acetate, and the like.

Amongst those water repellent topcoats which may be used in the final treatment of the cellulosic films after they have been subjected to treatment in the resin bonding bath, are those coating compositions containing as the film-forming constituent, compounds such as nitro cellulose, cellulose acetate, methyl cellulose, deacetylated chitin, rubber, chlorinated rubber, rubber hydrochloride, ethyl cellulose, butyl methacrylate, moisture-resistant lacquers, waxes such as montan wax, beeswax, carnauba wax, and other conventional film-forming coating materials.

The concentration of the resins in aqueous solution may be varied over a comparatively wide range while still producing effective results. However, from an economic standpoint, it is advisable to use these resins in solution in percentages varying between .05% and 5% by weight based on the total weight of solution. Concentrations higher than 5% may be used such as concentrations up to 20% or even higher, but it must be remembered that in the use of these higher solids resin solutions, the tendency toward gelation is increased and the necessity for the removal of excess resin increases.

I claim:

1. A process for treating non-fibrous regenerated cellulose film comprising the steps of impregnating said film with an aqueous dispersion of an urea-formaldehyde polyfunctional aliphatic polyamine cationic resin and an aqueous solution of a plasticizing agent, removing the film, drying the film, and applying thereto a water repellent topcoat.

2. A process for treating non-fibrous regenerated cellulosic film comprising the steps of impregnating said film with an aqueous dispersion of an urea-formaldehyde polyfunctional, aliphatic polyamine, cationic resin, removing the film, incorporating therein a plasticizing agent, drying the film, and applying thereto a water repellent topcoat.

3. A process for treating non-fibrous regenerated cellulosic film comprising the steps of impregnating said film with an aqueous dispersion of an urea-formaldehyde polyfunctional alkylene polyamine cationic resin, removing the film, incorporating therein a plasticizing agent, drying the film, and applying thereto a water repellent topcoat.

4. A process for treating non-fibrous regenerated cellulosic film comprising the steps of impregnating said film with an aqueous dispersion of an urea-formaldehyde polyfunctional polyalkylene polyamine cationic resin, removing the film, incorporating therein a plasticizing agent, drying the film, and applying thereto a water repellent topcoat.

5. A process for treating non-fibrous regenerated cellulosic film comprising the steps of impregnating said film with an aqueous dispersion of an urea-formaldehyde tetraethylene pentamine cationic resin, removing the film, incorporating therein a plasticizing agent, drying the film, and applying thereto a water repellent topcoat.

6. A process for treating non-fibrous regenerated cellulosic film comprising the steps of impregnating said film with an aqueous dispersion of an urea-formaldehyde diethylene triamine cationic resin, removing the film, incorporating therein a plasticizing agent, drying the film and applying thereto a water repellent topcoat.

7. A process for treating non-fibrous regenerated cellulosic film comprising the steps of impregnating said film with an aqueous dispersion of an urea-formaldehyde triethylene tetramine cationic resin, removing the film, incorporating therein a plasticizing agent, drying the film, and applying thereto a water repellent topcoat.

8. A process for treating non-fibrous regenerated cellulosic film comprising the steps of impregnating said film with an aqueous dispersion of an urea-formaldehyde 1,4-diamino-n-butane cationic resin, removing the film, incorporating therein a plasticizing agent, drying the film, and applying thereto a water repellent topcoat.

9. A process for treating non-fibrous regenerated cellulose film comprising the steps of impregnating said film with an aqueous dispersion of an urea-formaldehyde 1,3-diamino propane cationic resin, removing the film, incorporating therein a plasticizing agent, drying the film, and applying thereto a water repellent topcoat.

WILLIAM M. WOODING.

REFERENCES CITED

The following references are of record in the file of this patent:

UNITED STATES PATENTS

| Number | Name | Date |
|---|---|---|
| 2,394,009 | Pollard | Feb. 5, 1946 |
| 2,417,014 | Pollard | Mar. 4, 1947 |
| 2,485,485 | Dudley | Oct. 18, 1949 |